United States Patent [19]

Norum et al.

[11] Patent Number: 5,923,344

[45] Date of Patent: *Jul. 13, 1999

[54] FRACTIONAL DOT COLUMN CORRECTION FOR SCAN AXIS ALIGNMENT DURING PRINTING

[75] Inventors: Scott Norum, La Jolla; Clayton Holstun, San Marcos; Ronald A. Askeland; James A. Feinn, both of San Diego; Jaime H. Bohorquez, Escondido; James R. Schmedake, San Diego, all of Calif.

[73] Assignee: Hewlett-Packard Co., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/796,835

[22] Filed: Feb. 6, 1997

Related U.S. Application Data

[51] Int. Cl.⁶ ..................................................... B41J 29/38
[52] U.S. Cl. .................................................. 347/9; 400/76
[58] Field of Search .................... 347/9, 19; 400/120.07, 400/120.09, 61, 70, 76; 395/108

[56] References Cited

U.S. PATENT DOCUMENTS

| | | | |
|---|---|---|---|
| 4,503,444 | 3/1985 | Tacklind . | |
| 4,675,696 | 6/1987 | Suzuki | 346/46 |
| 5,049,898 | 9/1991 | Arthur et al. | 400/703 |
| 5,448,269 | 9/1995 | Beauchamp et al. | 347/19 |
| 5,480,240 | 1/1996 | Bolash et al. | 400/124.01 |
| 5,494,361 | 2/1996 | Sonoda | 400/120.02 |
| 5,600,350 | 2/1997 | Cobbs et al. | 347/19 |
| 5,604,597 | 2/1997 | Imai | 347/9 |

OTHER PUBLICATIONS

J. Stephen Aden, Jaime H. Bohórquez, Douglas M. Collins, M. Douglas Crook, André García, and Ulrich E. Hess, *The Third–Generation HP Thermal Inkjet Printhead*, Hewlett–Packard Journal, Feb. 1994, pp. 41–45.

*Primary Examiner*—John Hilten

[57] ABSTRACT

Data input received by a printer is printed. Dot data, which indicates location of dots on a print medium, is generated from the data input. Dot shift data is used in order to make sub-pixel shifts in locations of a subset of the dots on the print medium. Pulses are provided to a printhead which result in ink being emitted through nozzles located on the printhead. When placing the dots on the print medium, sub-pixel shifts in locations of the subset of the dots is achieved by time shifting the occurrence of pulses used to generate the dots.

24 Claims, 11 Drawing Sheets

FRACTIONAL DOT COLUMN CORRECTION FOR SCAN AXIS ALIGNMENT DURING PRINTING

BACKGROUND

The present invention concerns printers and pertains particularly to fractional dot column correction for better scan axis alignment during printing.

Thermal ink jet printers print by emitting ink droplets. The ink droplets are emitted by nozzles arranged on a printhead. Passive thermal inkjet heater circuitry is, for example, carried on a silicon chip. For general information on thermal inkjet printers, see for example, J. Stephen Aden, Jaime H. Bohórquez, Douglas M. Collins, M. Douglas Crook, André Garcia, and Ulrich E. Hess, *The Third-Generation HP Thermal Inkjet Printhead, Hewlett-Packard Journal*, February 1994, pp. 41–45.

It is possible for a thermal ink jet printer to emit discrete drops of a variable volume. For example, a pulse train of packets of pulses is used to generate drops comprising packets of connected or merged droplets. The reciprocal of the pulse repetition rate is greater than the bubble collapse time and the pulse packet rate is less than the maximum single droplet emission rate of the printhead. The individual droplets within the packet merge in flight to create a single drop whose volume depends upon the number of pulses contained within the pulse packet. See for example U.S. Pat. No. 4,503,444 issued to Christopher A. Tacklind, for METHOD AND APPARATUS FOR GENERATING A GRAY SCALE WITH A HIGH SPEED THERMAL INK JET PRINTER.

One issue when using a printhead with a large number of nozzles and a high resolution is correct alignment of all the nozzles so that the ink is correctly placed on the print media. Dot alignment can be done in both horizontal and vertical axes. The horizontal axis is generally referred to as the scan axis. The vertical axis is generally referred to as the paper advance axis (or just the paper axis).

Many factors can affect alignment. For example, slight variations during manufacturing can affect alignment. Additionally, the alignment of ink placed on a page can be dynamically affected during printing, for example dependent on the volume of a drop which is generated by merged droplets.

SUMMARY OF THE INVENTION

In accordance with the preferred embodiment of the present invention, data input received by a printer is printed. Dot data, which indicates location of dots on a print medium, is generated from the data input. Dot shift data is used in order to make sub-pixel shifts in locations of a subset of the dots on the print medium. The dots are placed on the print medium.

In the preferred embodiment, pulses are provided to a printhead which result in ink being emitted through nozzles located on the printhead. The pulses used to generate the dots are selected from a train of firing pulses. The firing pulses within the train of firing pulses repeats at a frequency that is higher than the pixel frequency. Sub-pixel shifts in location of the subset of the dots are performed by selecting different firing pulses to place the subset of the dots on the print medium.

In one embodiment of the present invention, the dot shift data differs depending upon a user selected print mode. For example, in a special print mode, the dot shift data is used to horizontally shift every other row of dots in order to form a honeycomb pattern. In an alternative embodiment of the present invention, the dot shift data is used to shift each of the subset of dots an amount based on the size of each dot. Alternatively, or in additional, the dot shift data is used to perform sub-pixel alignment of the dots on the print medium.

When the dot shift data is used to perform sub-pixel alignment of the dots on the print medium, the dot shift data may be generated in a number of ways. For example, after manufacture, a printhead is tested for dot alignment. While still within the factory, the alignment information is encoded within the printhead or on the pen. When the printhead is installed on a printer, the printer reads the encoded alignment information and from the encoded alignment information generates the dot shift data.

Alternatively, the dot shift data may be generated with the assistance of a user. In this case, the user instructs the printer to print a test pattern. Based on the test pattern, the user inputs coded information to the printer. The printer generates the dot shift data based on the coded information from the user.

Alternatively, the dot shift data may be generated autonomously by the printer. In this case, the printer prints a test pattern. The printer obtains alignment information based on the test pattern and generates the dot shift data based on the alignment information.

The present invention provides for a simple versatile means to adjust dot placement on print medium. The adjustment is done precisely without requiring extensive changes to hardware. The adjustment of dot placement—which allows, for example, different print modes—facilitates optimization of the printer for different types of outputs. For example, in one print mode, dots are aligned orthogonally generally allowing for better text printing. In another print mode, dots are aligned using a honeycomb pattern generally allowing for better images. The present invention thus allows for both print modes to be present in a single printer. This allows a printer to produce optimized output for both text and images. Also, the present invention is applicable to a variety of inkjet pen/printer systems. For example, pen/printer systems which already operate at or near maximum firing frequencies could utilize the present invention by modifying the printer electronics and slowing down the carriage speed of the printer.

DESCRIPTION OF THE PREFERRED EMBODIMENT

Figure 1:
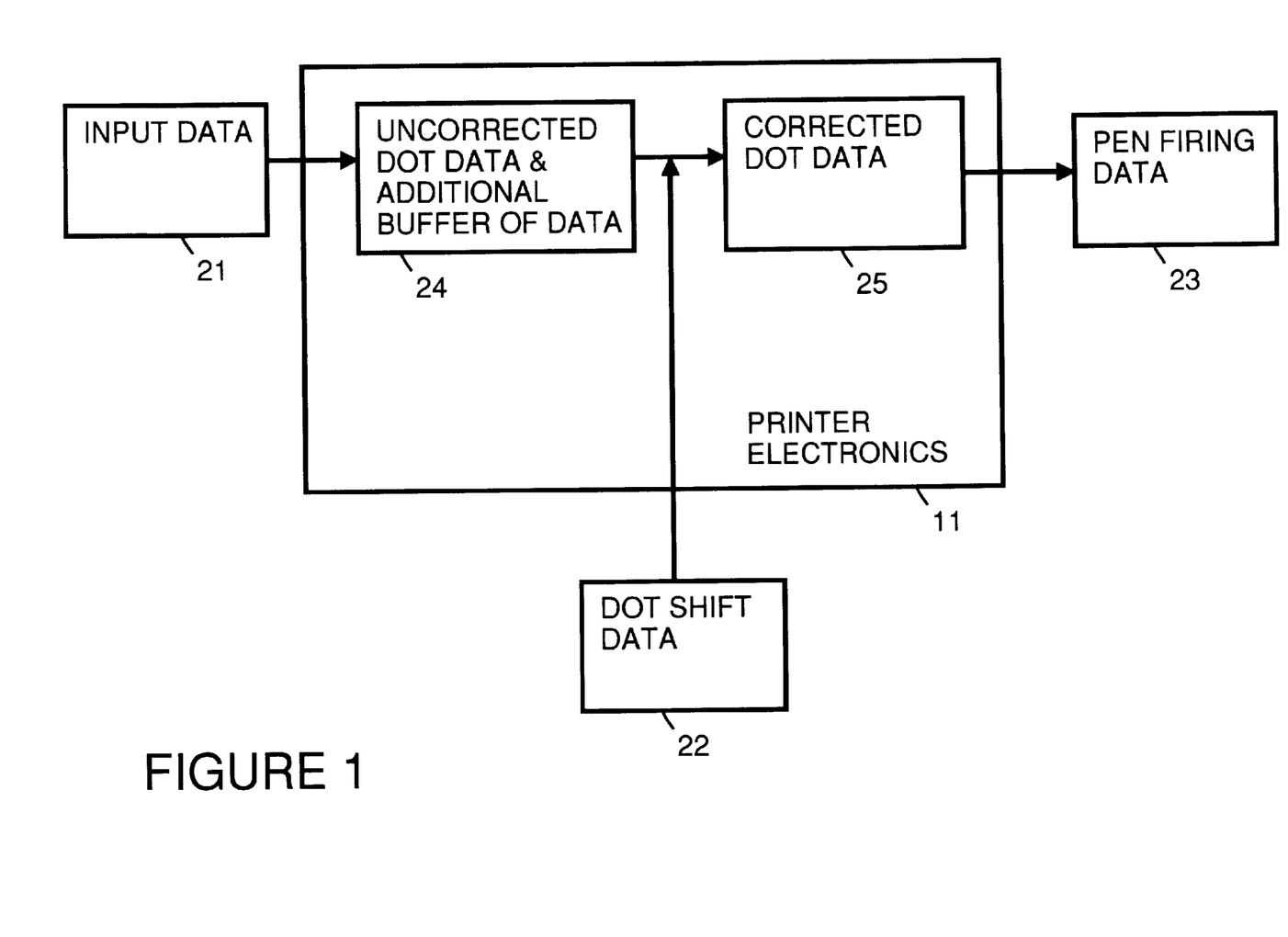
FIG. 1 shows how dot shift data can be utilized to align drops emitted from a printer in accordance with a preferred embodiment of the present invention.

FIG. 1 shows print electronics 11 receiving input data 21. Input data 21 includes information describing printed characters and/or images for printing. For example, input data 21 is in a printer format language such as Postscript, PCL 3, PCL 5, HPGL, HPGL 2 or some related version of these. Alternatively, input data 21 may be formatted as raster data or formatted in some other printer language. From input data 21, printer electronics 11 generates uncorrected dot data 24 for the printed characters and/or images. Uncorrected dot data 24 indicates the location and the drop volume for dots which will form the printed characters and/or images. Uncorrected dot data 24 is stored in an additional buffer within printer electronics 11, which serves to buffer uncorrected dot data 24 to allow the modification of uncorrected dot data 24. Printer electronics 11 modifies uncorrected dot data 24, using dot shift data 22, in order to produce corrected dot data 25. Corrected dot data 25 is used by printer electronics 11 to produce pen (printhead) firing data 23 which is used to control the nozzles of an ink jet printer. Firing data 23 could be used, for example, for a thermal ink jet printer or for other types of ink jet printers such as piezo ink jet printers or even printers which use technology other than ink jets.

The dynamic introduction of dot shift data 22 by printer electronics 11 in order to produce corrected dot data 25 allows for dynamic alignment of dots on the print medium by varying the time of the occurrence of pulses which control the emission of ink drops from the nozzles of a printhead.

Figure 2:
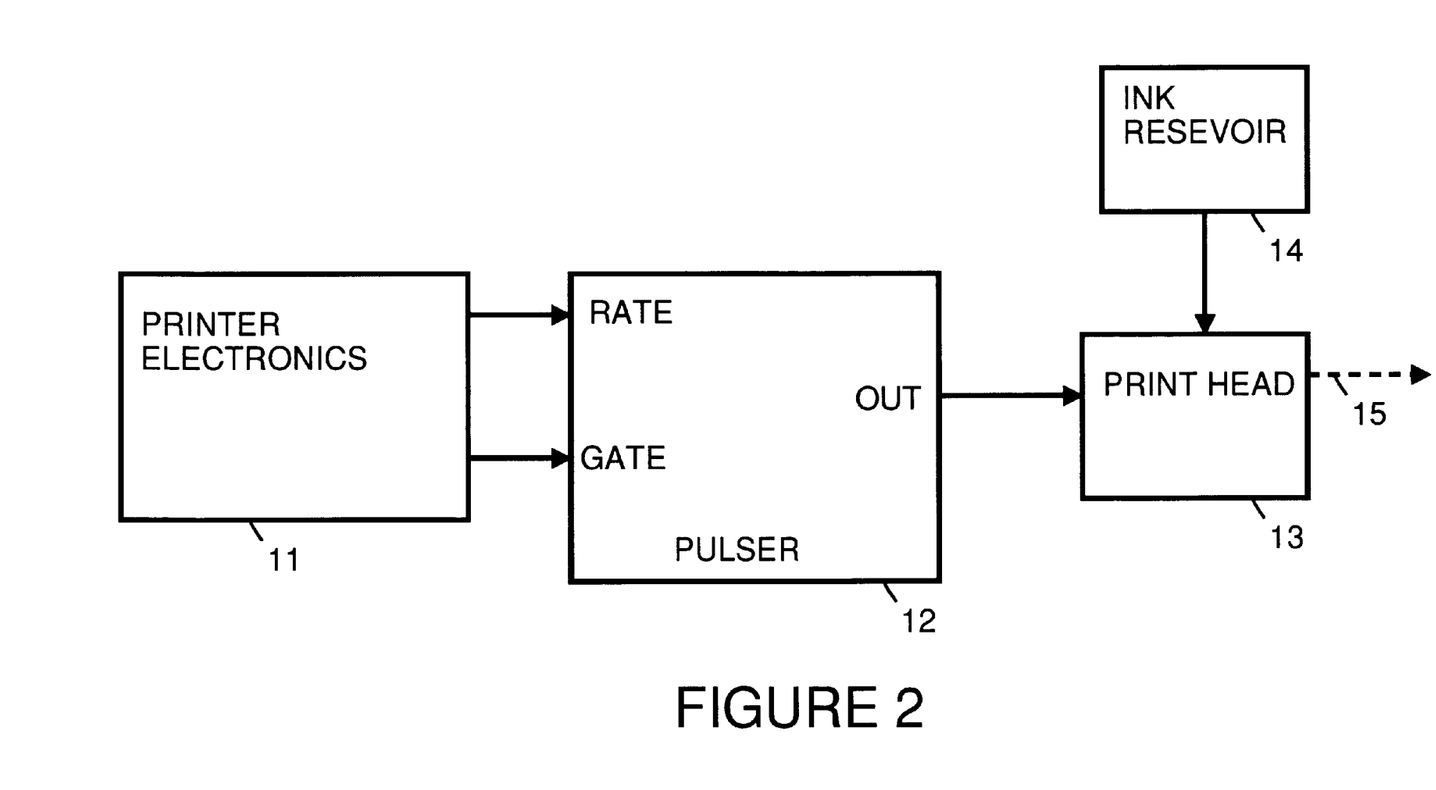
FIG. 2 illustrates firing data utilized to generate an implementation which shows how drops are emitted from a printhead in accordance with a preferred embodiment of the present invention.

For example, as shown in FIG. 2, pen (printhead) firing data is used by a pulser 12 to generate pulses which control a nozzle 13 located on a printhead. Pulser 12 may be located on or off the printhead, depending on the particular implementation of the present invention. In the example shown in FIG. 2, printer electronics provides to pulser 12 pen firing data on two lines. Information on the first line sets the pulse rate and information on the second line indicates which pulses are to be forwarded to nozzle 13. The pulses forwarded to nozzle 13 are forwarded as a current pulse which is applied to a resistor associated with nozzle 13. The current pulse causes an ink droplet 15, formed from ink within an ink reservoir 14, to be emitted from nozzle 13. Varying the timing of a pulse on which the ink drop(s) for the particular dot are fired from the nozzle varies the scan axis alignment of the dot on the page.

Figure 3:
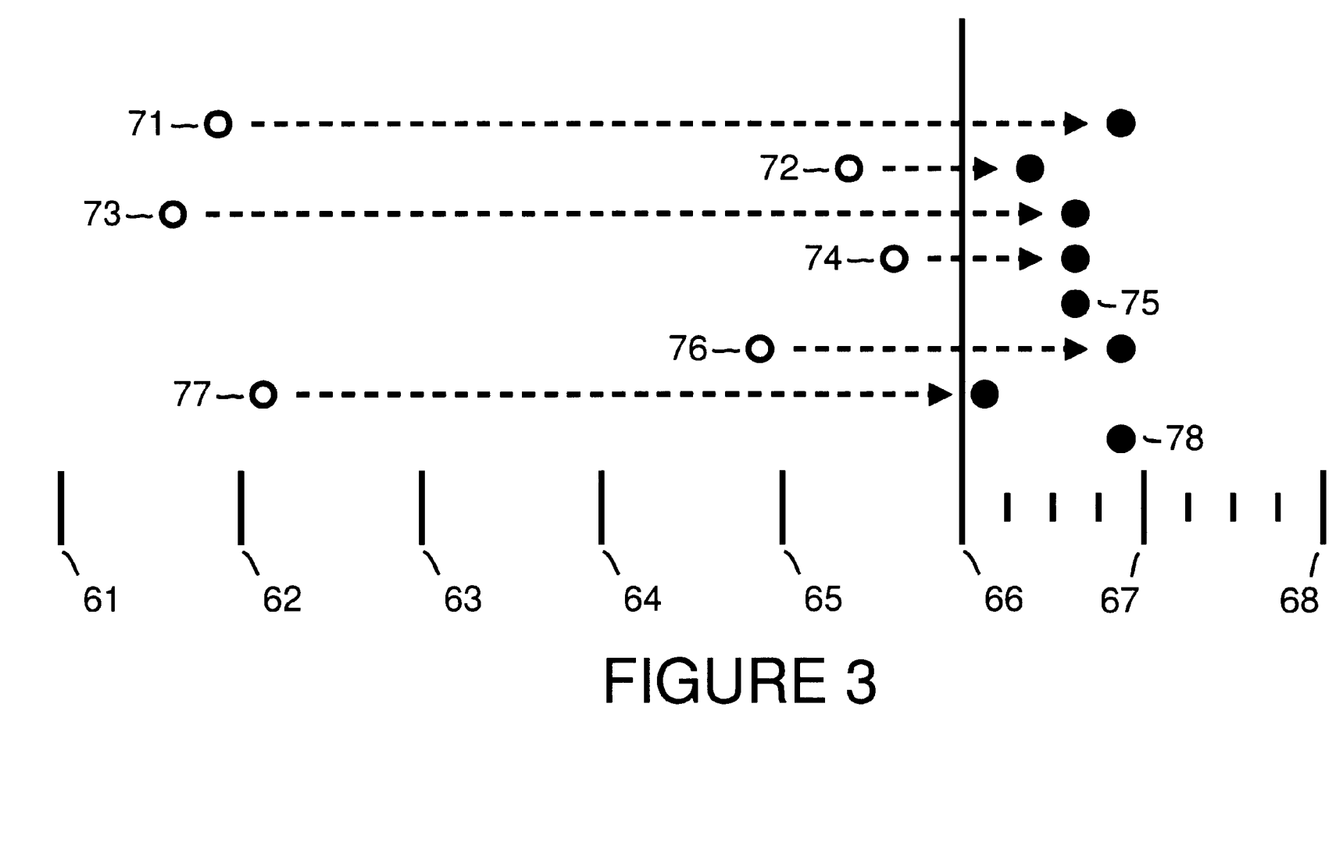
FIG. 3 illustrates pixel alignment of drops on a print medium.

FIG. 3 illustrates pixel alignment of drops on a print medium. Scale lines 61, 62, 63, 64, 65, 66, 67 and 68 show spacing on a page for 600 dots per inch (dpi) printing. Dots 71, 72, 73, 74, 75, 76, 77 and 78 (whose sizes are not to scale), are dots utilized by the printer to create a vertical line. The vertical line is to be composed of dots within the horizontal pixel region defined between scale lines 66 and 67. Before pixel alignment, dots 71, 72, 73, 74, 76 and 77 are not within the horizontal pixel region defined between scale lines 66 and 67, as represented by "open dots" for each of dots 71, 72, 73, 74, 76 and 77. These dots are pixel aligned by firing the associated nozzles earlier or later. These shifts in the time of firing the associated nozzles are turned into shifts in space on the print media by the movement of the carriage for the printhead across the print medium.

In the example shown in FIG. 3, assuming the carriage movement is from left to right, the ink drop for dot 71 is fired five 600 dpi columns late in order to align dot 71 within the horizontal pixel region defined between scale lines 66 and 67. The ink drop(s) for dot 72 is fired one 600 dpi column late in order to align dot 72 within the horizontal pixel region defined between scale lines 66 and 67. The ink drop(s) for dot 73 is fired five 600 dpi columns late in order to align dot 73 within the horizontal pixel region defined between scale lines 66 and 67. The ink drop(s) for dot 74 is fired one 600 dpi column late in order to align dot 74 within the horizontal pixel region defined between scale lines 66 and 67. The ink drop(s) for dot 76 is fired two 600 dpi columns late in order to align dot 76 within the horizontal pixel region defined between scale lines 66 and 67. The ink drop(s) for dot 77 is fired four 600 dpi columns late in order to align dot 77 within the horizontal pixel region defined between scale lines 66 and 67.

Figure 4:
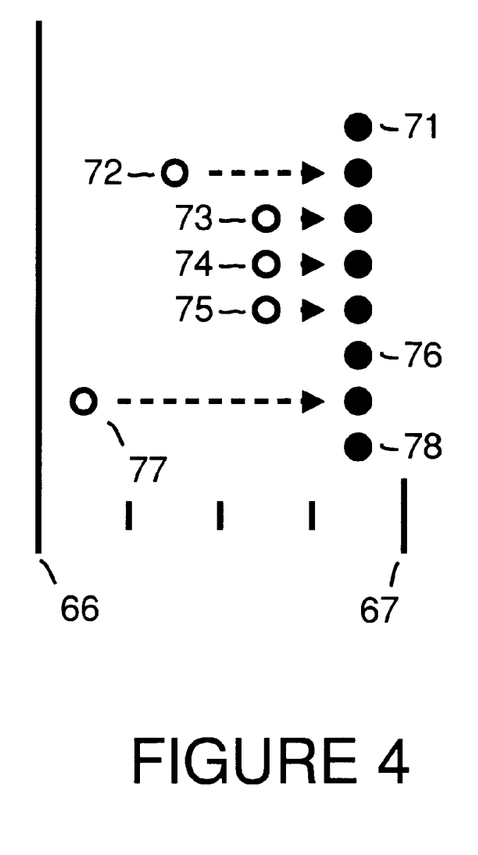
FIG. 4 illustrates sub-pixel alignment of drops on a print medium in accordance with a preferred embodiment of the present invention.

FIG. 4 illustrates sub-pixel alignment of drops on a print medium. Sub-scale lines shown between pixel scale lines 66 and 67 show pulse spacing on a page when four pulses are fired for each 600 dots per inch (dpi) pixel. Dots 71, 72, 73, 74, 75, 76, 77 and 78 (whose sizes are not to scale), are aligned in a vertical line. During sub-pixel alignment, dots 72, 73, 74, 75 and 77 are additionally aligned by time shifting the pulses used to generate these dots. These shifts in the time of firing the associated nozzles are turned into shifts in space on the print media by the movement of the carriage for the printhead across the print medium.

In the example shown in FIG. 4, assuming the carriage movement is from left to right, the ink drop for dot 72 is fired two pulses late in order to align dot 72. The ink drop for dot 73 is fired one pulse late in order to align dot 73. The ink drop for dot 74 is fired one pulse late in order to align dot 74. The ink drop for dot 75 is fired one pulse late in order to align dot 75. The ink drop for dot 77 is fired three pulses late in order to align dot 77.

Figure 5:
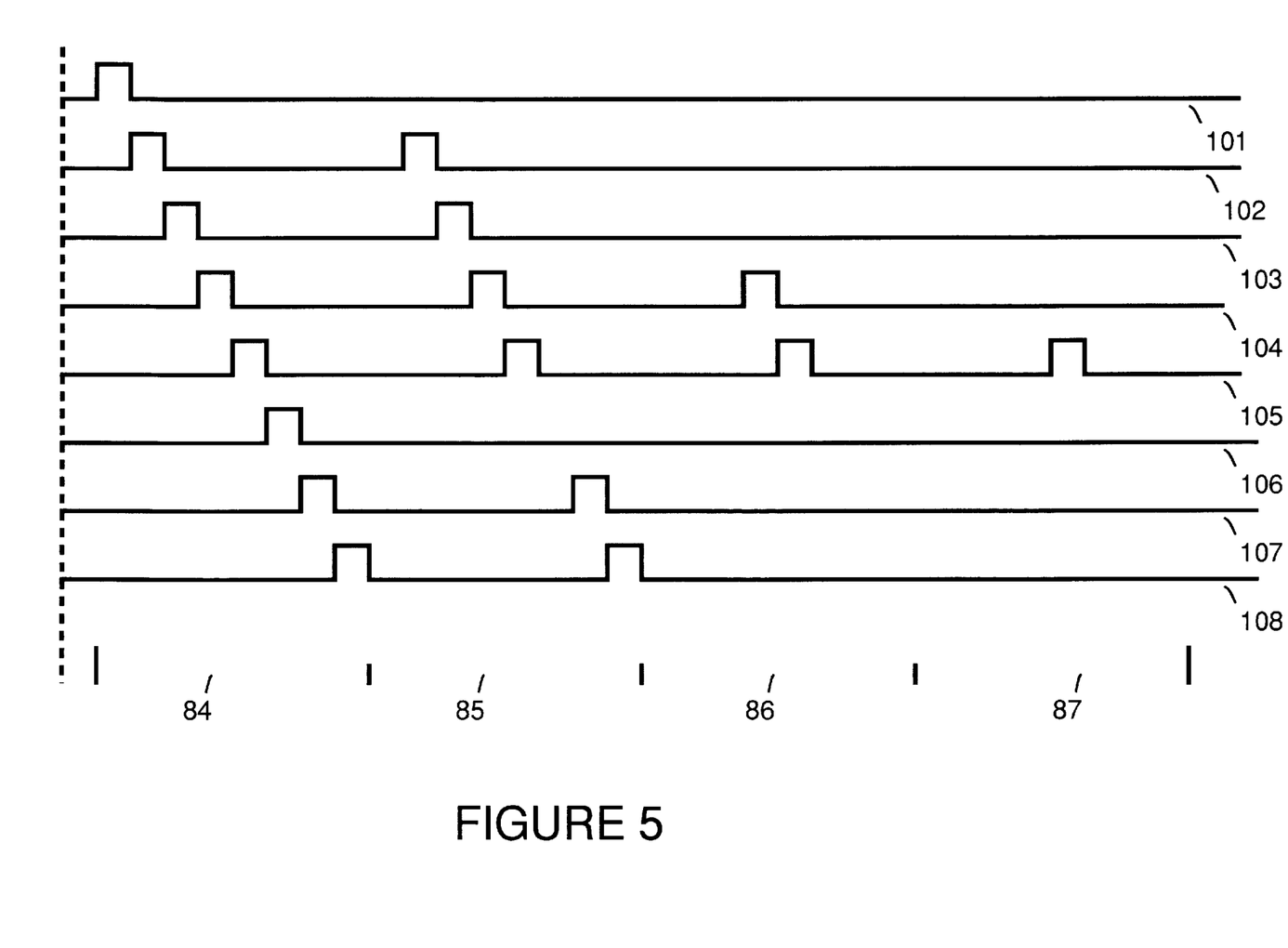
FIG. 5 and FIG. 6 illustrates generation of pulses for sub-pixel alignment of drops of variable volume on a print medium in accordance with a preferred embodiment of the present invention.
Figure 6:
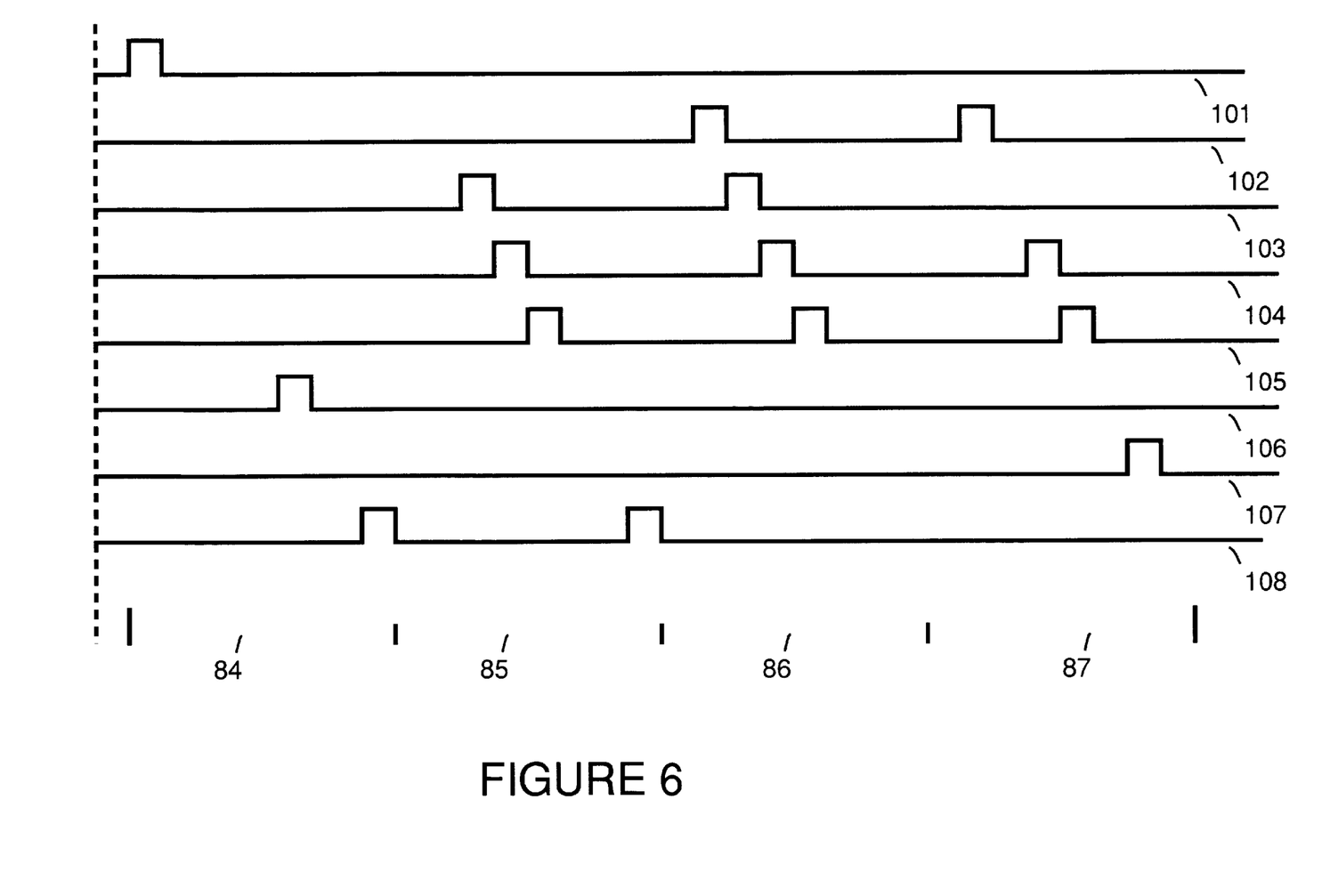

FIGS. 5 and 6 illustrates the pulses utilized to generate dots 71 through 78. Spacing of the pulses is shown in order to accurately perform the sub-pixel alignment. For the example illustrated by FIG. 5, dot 71 is generated using one pulse (i.e., is created from a drop which has a volume of one droplet), dot 72 is generated using two pulses (i.e., is created from a drop which has a volume of two droplets), dot 73 is generated using two pulses (i.e., is created from a drop which has a volume of two droplets), dot 74 is generated using three pulses (i.e., is created from a drop which has a volume of three droplets), dot 75 is generated using four pulses (i.e., is created from a drop which has a volume of four droplets), dot 76 is generated using one pulse (i.e., is created from a drop which has a volume of one droplet), dot 77 is generated using two pulses (i.e., is created from a drop which has a volume of two droplets) and dot 78 is generated using two pulses (i.e., is created from a drop which has a volume of two droplets).

Each of pulse intervals 84, 85, 86 and 87 when translated into space, represents a position one fourth of a 600 dpi column in width. In other words, there are potentially four pulses per dot, allowing the drops generated to vary in volume from one to four droplets. Also, the dots may be varied increments of one fourth times 600 dpi, or 2400 dpi. The occurrence of the pulse within the interval for each signal is staggered in order to allow for sufficient current to be generated for each pulse. While the present example utilizes four pulses per 600 dpi column, resolution may be increased (or decreased), for example, using eight pulses per 600 dpi column.

FIG. 5, given for reference, illustrates the case where there is no sub-pixel alignment. In FIG. 5, signal 101, which generates dot 71, has a first pulse in pulse interval 84. The two pulses in a signal 102 used to generate dot 72 occur in pulse interval 84 and pulse interval 85. The two pulses in a signal 103 used to generate dot 73 occur in pulse interval 84 and pulse interval 85. The three pulses in a signal 104 used to generate dot 74 occur in pulse intervals 84, 85 and 86. The four pulses in a signal 105 used to generate dot 75 occur in pulse intervals 84, 85, 86 and 87. Signal 106, which generates dot 76, has a first pulse in pulse interval 84. The two pulses in a signal 107 used to generate dot 77 occur in pulse intervals 84 and 85. Signal 108, which generates dot 78, has a first pulse in pulse interval 84 and a second pulse in pulse interval 85.

FIG. 6 shows changes made to the signals shown in FIG. 5 when the sub-pixel alignment has been performed. In FIG. 6, signal 101, which generates dot 71, has a first pulse in pulse interval 84. As illustrated by FIG. 4, the ink drop for dot 72 needs to be shifted two positions to the right in order to be aligned with dot 71. Therefore, the two pulses in a signal 102 used to generate dot 72 occur beginning in pulse interval 86. The ink drop for dot 73 needs to be shifted one position to the right in order to be aligned with dot 71. Therefore, the two pulses in a signal 103 used to generate dot 73 occur beginning in pulse interval 85. The ink drop for dot 74 needs to be shifted one position to the right in order to be aligned with dot 71. Therefore, the three pulses in a signal 104 used to generate dot 74 occur beginning in pulse interval 85. The ink drop for dot 75 needs to be shifted one position to the right in order to be aligned with dot 71. Therefore, the four pulses in a signal 105 used to generate dot 75 occur beginning in pulse interval 85 (the fourth pulse is not shown). Signal 106, which generates dot 76, has a first pulse in pulse interval 84. The ink drop for dot 77 needs to be shifted three positions to the right in order to be aligned with dot 71. Therefore, the two pulses in a signal 107 used to generate dot 77 occur beginning in pulse interval 87 (the second pulse is not shown). Signal 108, which generates dot 78, has a first pulse in pulse interval 84 and a second pulse in pulse interval 85.

Figure 7:
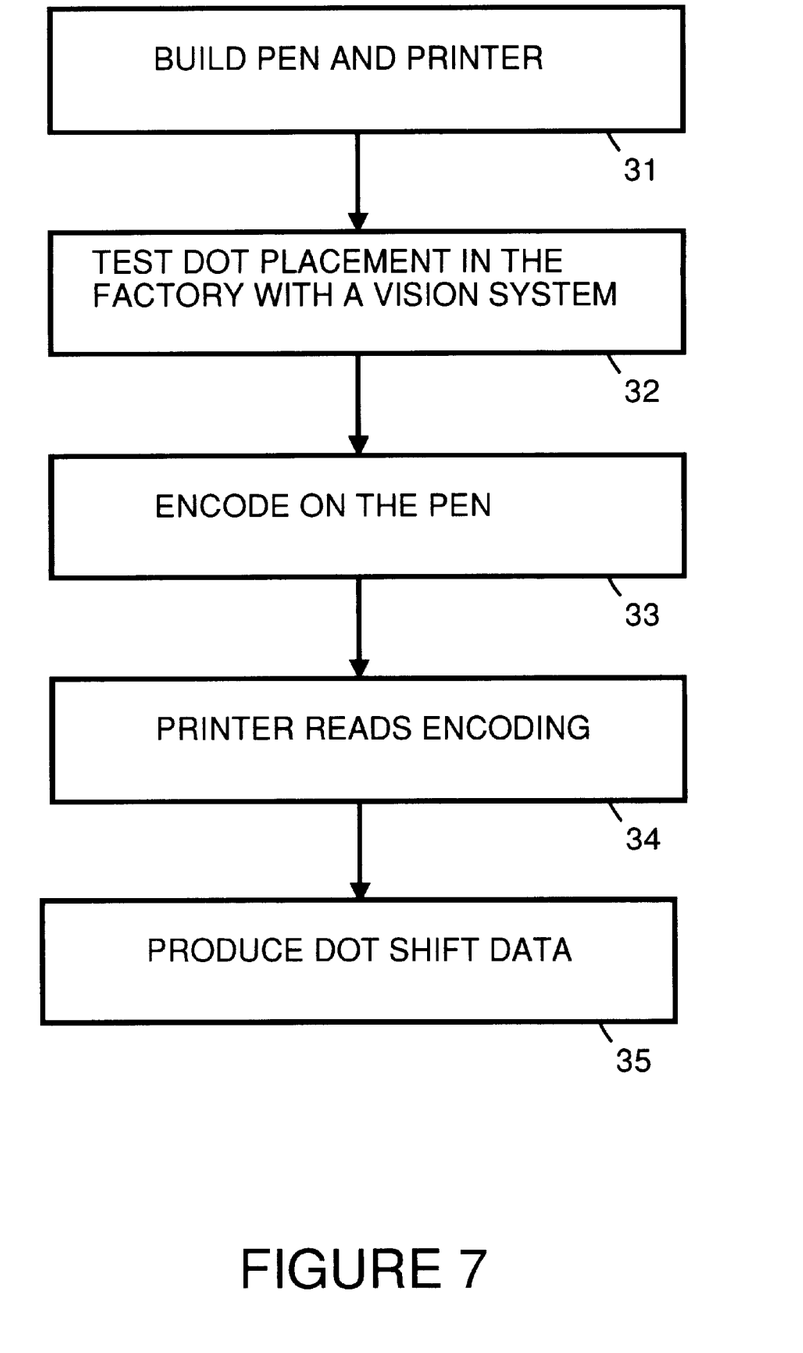
FIG. 7 is a flowchart which describes generation of dot shift data in accordance with a preferred embodiment of the present invention.

As described above, the amount of shift for each nozzle is controlled by dot shift data 22. To take into account alignment, dot shift data 22 may be generated in a number of ways. For example, FIG. 7 shows one method.

In a step 31, the pen (printhead) and printer is built. In a step 32, the drop placement is tested in the factory with a vision system. From this placement testing, it can be determined if drops from a particular nozzle on the pen needs to be fired early or late in order to be aligned properly. In a step 33, this information is encoded on the pen. The information indicates for each nozzle the number of pulses early or late the nozzle should be fired.

In a step 34, when the pen is placed into a printer, the printer reads the encoding on the pen and, in a step 35 generates dot shift data 22. Dot shift data 22 indicates for each nozzle the number of pulses early or late the nozzle should be fired.

Figure 8:
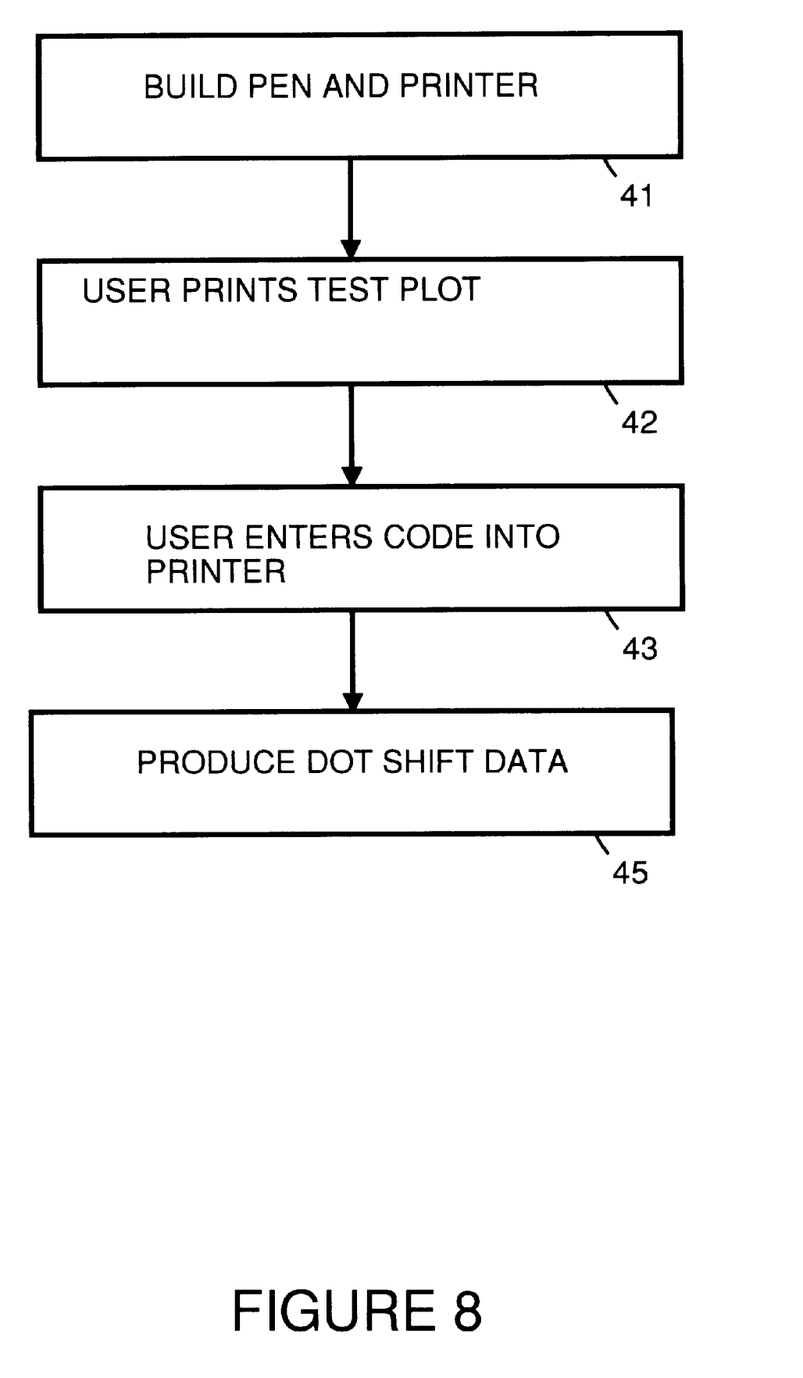
FIG. 8 is a flowchart which describes generation of dot shift data in accordance with an alternative preferred embodiment of the present invention.

FIG. 8 shows an alternative method for generating dot shift data 22. In a step 41, the pen (printhead) and printer is built. In a step 42, the user of the printer in which the printhead is installed prints a test plot. Based on the test plot, as compared with additional information provided to the user, in a step 43, the user enters a code into the printer. The code contains information which indicates for each nozzle the number of pulses early or late the nozzle should be fired. In a step 45, the printer utilizes the code entered by the user and generates dot shift data 22. Dot shift data indicates for each nozzle the number of pulses early or late the nozzle should be fired.

Figure 9:
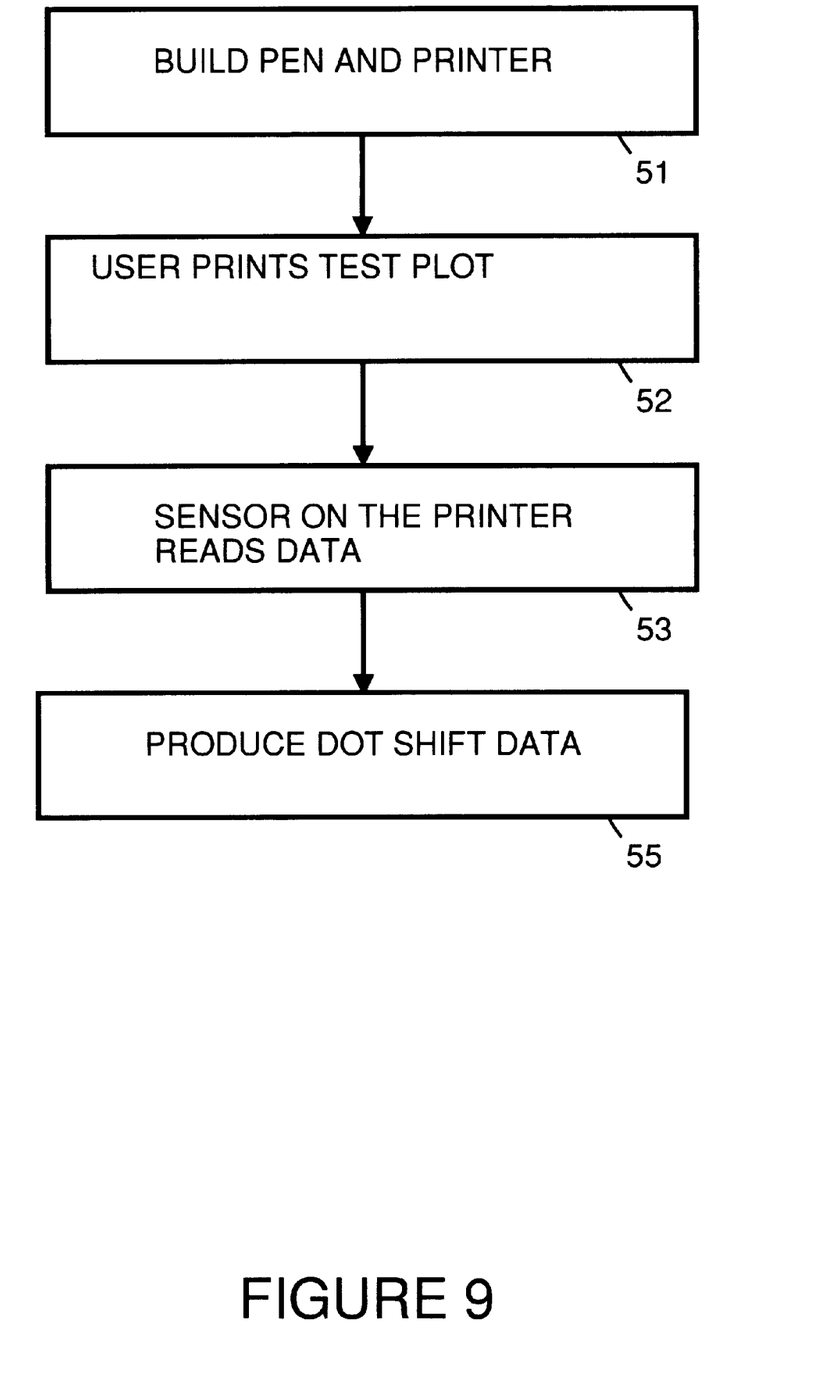
FIG. 9 is a flowchart which describes generation of dot shift data in accordance with another alternative preferred embodiment of the present invention.

FIG. 9 shows another alternative method for generating dot shift data 22. In a step 51, the pen (printhead) and printer is built. In a step 52, the user of the printer in which the printhead is installed prints a test plot. In a step 53, a sensor within the printer reads and interprets the test plot. In a step 55, the printer utilizes the interpretation of the test plot to generate dot shift data 22. Dot shift data indicates for each nozzle the number of pulses early or late the nozzle should be fired.

Figure 10:
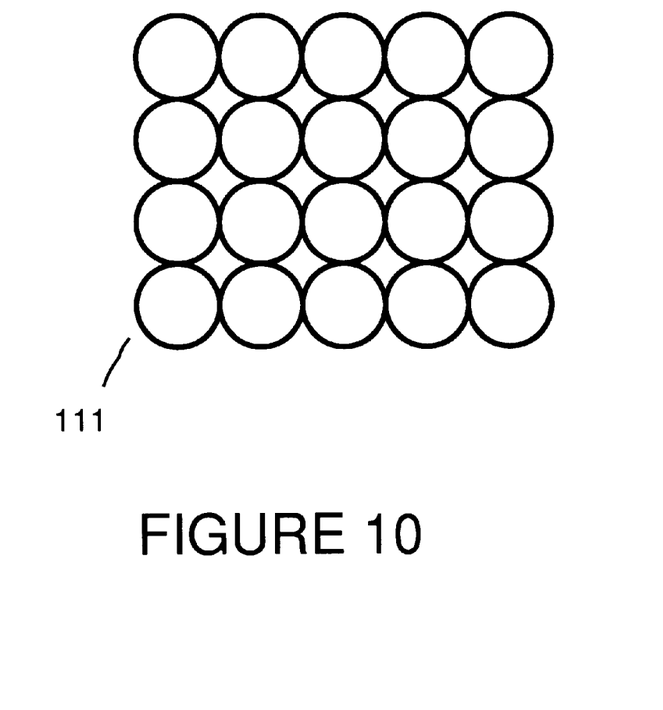
FIG. 10 and FIG. 11 illustrate different print modes in accordance with another alternative preferred embodiment of the present invention.
Figure 11:
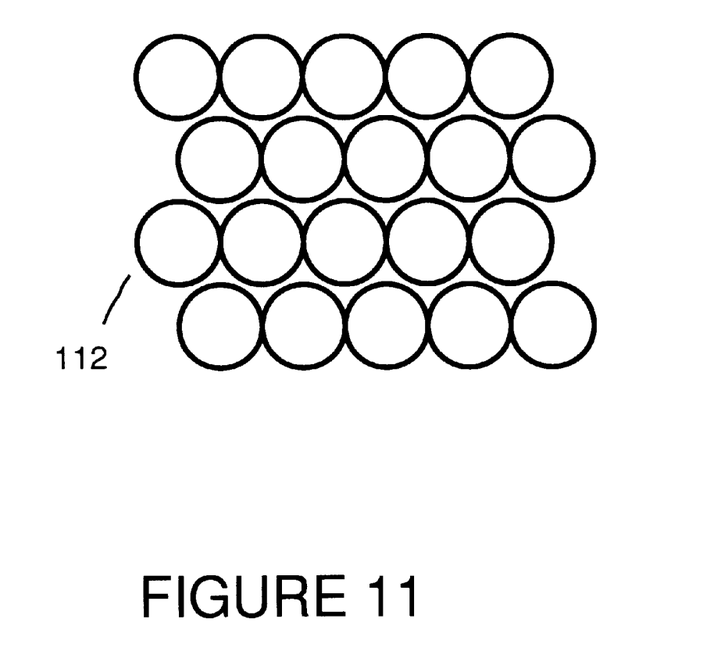

In a preferred embodiment of the present invention, dot shift data 22 is also generated internally by the printer. For example, FIGS. 10 and 11 illustrate use of dot shift data 22 to change the print mode. In FIG. 10, dots 111 are printed in a normal print mode. In FIG. 11, dots 112 are printed in a honeycomb pattern using a special print mode. In order to generate the honeycomb pattern, dot shift data 22 indicates that, for every other row of dots, the pulses which generate the dots are delayed two pulses. Alternatively, the honeycomb pattern may be generated by data shift data 22 which indicates that, for every other row of dots, the pulses which generate the dots are generated two pulses earlier.

Also in a preferred embodiment of the present invention, dot shift data 22 is used to compensate for shift in location of dots when the center of dots are slightly misaligned based on the size of drops.

Figure 12:
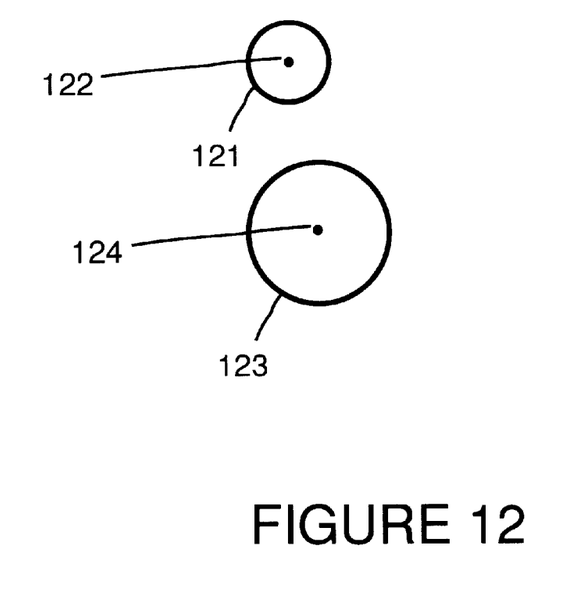
FIG. 12 and FIG. 13 illustrate correction alignment when misalignment is caused by variation in dot size in accordance with a preferred embodiment of the present invention.
Figure 13:
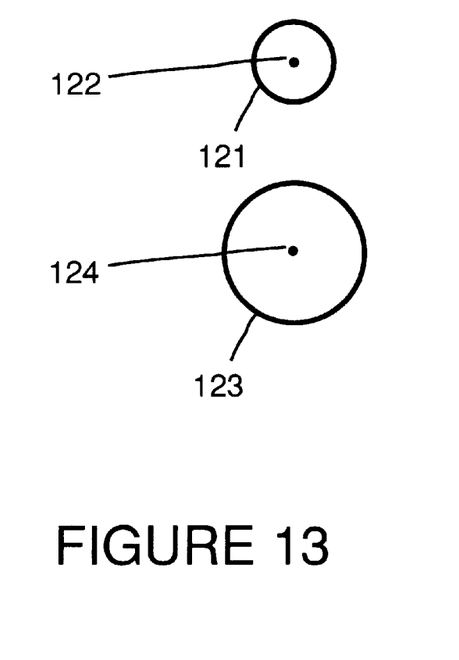

For example, FIG. 12, in an exaggerated perspective, shows how a center 122 of an ink drop 121 formed from one droplet has a different horizontal alignment than a center 124 of an ink drop 123 formed from four droplets. By utilizing dot shift data 22 to delay the firing of the pulse which creates ink drop 122, center 122 of ink drop 121 can be horizontally aligned with center 124 of ink drop 123. This is illustrated by FIG. 13. Alternatively, dot shift data 22 can cause the early firing of the four pulses which creates ink drop 124 in order to horizontally align the center 123 of ink drop 124 with center 122 of ink drop 121.

Dot shift data 22 can also be used to shift target locations independently for individual colors. This can avoid unwanted Moiré patterns which are created when the different colors are all targeted at the same location and have very slight offsets from that target location. For example, the target locations for black ink are not shifted while the target locations for cyan, magenta and yellow are variously shifted. This technique can be used to simulate usage of a different screen angle for each color printed, as is done for commercial printing.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for printing data input received by a printer, the method comprising the following steps:
   (a) generating, from the data input, dot data which indicates location of dots on a print medium;
   (b) generating a train of firing pulses, firing pulses within the train of firing pulses repeating at a frequency that is higher than a pixel frequency; and
   (c) placing the dots on the print medium including the following substeps:
   (c.1) using dot shift data in order to make sub-pixel shifts in locations of a subset of the dots on the print medium, the dot shift data being based on alignment information for individual nozzles on a printhead, the alignment information providing information on how the individual nozzles are aligned relative to other nozzles on the print head, and
   (c.2) selecting a firing pulse within the train of firing pulses for each dot, the firing pulse selected for each dot being dependent on any sub-pixel shift in location of the dot as made in substep (c.1).

2. A method as in claim 1 wherein in substep (c.1) the dot shift data differs depending upon a user selected print mode.

3. A method as in claim 1 wherein in substep (c.1) the dot shift data used to make sub-pixel shifts dot shift data varies depending upon output content of the printer.

4. A method as in claim 1 wherein in substep (c.1), the dot shift data is used to independently shift target locations for individual colors.

5. A method for printing data input received by a printer, the method comprising the following steps:
   (a) generating, from the data input, dot data which indicates location of dots on a print medium;
   (b) when the printer is in a normal mode, placing the dots on the print medium in an orthogonal pattern;
   (c) when the printer is in a special print mode, placing the dots on the print medium in a honeycomb pattern, including
   using dot shift data to shift every other row of dots in order to form the honeycomb pattern, wherein when printing in the special print mode, resolution, dot size and horizontal dot spacing are unchanged from printing in the normal mode.

6. A method as in claim 5 wherein in step (b) the printer is in the normal mode when the data input is text, and in step (c) the printer is in the special print mode when the data input is graphic images.

7. A method for printing data input received by a printer, the method comprising the following steps:
   (a) generating, from the data input, dot data which indicates location of dots on a print medium, the dots being of at least two different sizes;
   (b) using dot shift data in order to make sub-pixel shifts in locations of a subset of the dots on the print medium, including
   using the dot shift data to shift each of the subset of the dots an amount based on a size of each dot; and,
   (c) placing the dots on the print medium.

8. A method for printing data input received by a printer, the method comprising the following steps:
   (a) generating alignment information for individual nozzles on a printhead, the alignment information providing information on how the individual nozzles are aligned relative to other nozzles on the print head;
   (b) generating, from the data input, dot data which indicates location of dots on a print medium;
   (c) using dot shift data in order to make sub-pixel shifts in locations of a subset of the dots on the print medium, the sub-pixel shifts for each dot being based on the alignment information generated in step (a); and,
   (d) placing the dots on the print medium.

9. A method as in claim 8 wherein step (a) includes the following substeps:
   (a.1) testing a printhead for dot alignment; and
   (a.2) encoding alignment information within the printhead.

10. A method as in claim 8 wherein step (a) includes the following substeps:
    (a.1) printing a test pattern; and,
    (a.2) receiving from a user coded information based on the test pattern printed in substep (a.1).

11. A method as in claim 8 wherein step (a) includes the following substeps:
    (a.1) printing a test pattern; and,
    (a.2) obtaining, by the printer, alignment information based on the test pattern printed in substep (a.1).

12. A printer comprising:
    printer electronics which, from print data input, generate dot data which indicates location of dots on a print medium, the printer electronics including:
    sub-pixel adjustment means for using dot shift data in order to make sub-pixel shifts in locations of a subset of the dots on the print medium; and,
    a printhead, coupled to the printer electronics, which in response to the dot data places the dots on print medium, the printhead utilizing a train of firing pulses to place the dots on the print media, the firing pulses within the train of firing pulses repeating at a frequency that is higher than a pixel frequency, the printhead including:
    a plurality of nozzles, wherein the dot shift data is based on alignment information for the plurality of nozzles, the alignment information providing information on how each of the plurality of nozzles is aligned relative to other nozzles on the print head;
    wherein the sub-pixel adjustment means performs sub-pixel shifts in location of the subset of the dots by selecting different firing pulses to be used by the printhead to place the subset of the dots on the print medium.

13. A printer as in claim 12 wherein the dot shift data differs depending upon a user selected print mode.

14. A printer as in claim 12 wherein the sub-pixel adjustment means uses the dot shift data to perform sub-pixel alignment of the dots on the print medium.

15. A printer as in claim 12 wherein the printer electronics provides pulses to the printhead which result in ink being emitted through a nozzle located on the printhead.

16. A printer as in claim 12 wherein the dot shift data is used to make sub-pixel shifts dot shift data varies depending upon output content of the printer.

17. A printer as in claim 12 wherein the dot shift data is used to independently shift target locations for individual colors.

18. A printer comprising:
    printer electronics which, from print data input, generate dot data which indicates location of dots on a print medium, the printer electronics including:
    sub-pixel adjustment means for using dot shift data in order to make sub-pixel shifts in locations of a subset of the dots on the print medium, wherein when the printer is in a normal mode, the dots are shifted as necessary to produce an orthogonal pattern, wherein when the printer is in a special print mode, the dots are shifted as necessary to produce a honeycomb pattern, and wherein when printing in the special print mode, resolution, dot size and horizontal dot spacing are unchanged from printing in the normal mode; and, a printhead, coupled to the printer electronics, which in response to the dot data places the dots on print medium.

19. A printer as in claim 18 wherein the printer is in the normal mode when the print data input is text, and the printer is in the special print mode when the print data input is graphic images.

20. A printer comprising:

printer electronics which, from print data input, generate dot data which indicates location of dots on a print medium, wherein the dot shift data is generated using alignment information, the printer electronics including:

sub-pixel adjustment means for using dot shift data in order to make sub-pixel shifts in locations of a subset of the dots on the print medium; and, a printhead, coupled to the printer electronics, which in response to the dot data places the dots on print medium, the printhead including:

a plurality of nozzles, wherein the alignment information provides information on how each of the plurality of nozzles is aligned relative to other nozzles on the print head.

21. A printer as in claim 18 wherein the alignment information is encoded within the printhead.

22. A printer as in claim 18 wherein the alignment information is received from a user.

23. A printer as in claim 18 wherein the alignment information is obtained by the printer from a printed test pattern.

24. A printer comprising:

printer electronics which, from print data input, generate dot data which indicates location of dots on a print medium, the dots being of at least two different sizes, the printer electronics including:

sub-pixel adjustment means for using dot shift data in order to make sub-pixel shifts in locations of a subset of the dots on the print medium, the sub-pixel adjustment means using the dot shift data to shift each of the subset of the dots an amount based on a size of each dot; and, a printhead, coupled to the printer electronics, which in response to the dot data places the dots on print medium.

* * * * *